(12) United States Patent
Hussain

(10) Patent No.: US 11,092,074 B2
(45) Date of Patent: Aug. 17, 2021

(54) BLEED EJECTOR

(71) Applicant: ROLLS-ROYCE plc, London (GB)

(72) Inventor: Zahid M. Hussain, Derby (GB)

(73) Assignee: ROLLS-ROYCE plc, London (GB)

( * ) Notice: Subject to any disclaimer, the term of this patent is extended or adjusted under 35 U.S.C. 154(b) by 54 days.

(21) Appl. No.: 16/202,631

(22) Filed: Nov. 28, 2018

(65) Prior Publication Data

US 2019/0178161 A1 Jun. 13, 2019

(30) Foreign Application Priority Data

Dec. 13, 2017 (GB) .................................... 1720727

(51) Int. Cl.
*F02C 3/32* (2006.01)
*F02C 6/08* (2006.01)
(Continued)

(52) U.S. Cl.
CPC ................ *F02C 3/32* (2013.01); *F01D 25/32* (2013.01); *F02C 6/08* (2013.01); *F02C 7/05* (2013.01);
(Continued)

(58) Field of Classification Search
CPC ...... F02C 6/08; F02C 7/05; F02C 7/18; F02C 3/32; F02C 9/18; F02K 3/075;
(Continued)

(56) References Cited

U.S. PATENT DOCUMENTS 4,711,084 A * 12/1987 Brockett ................... F02C 3/32
60/785
4,881,367 A * 11/1989 Flatman ................. B64D 33/02
60/785
(Continued)

FOREIGN PATENT DOCUMENTS

EP 3146184 A1 3/2017
FR 3044636 6/2017
WO 2015178897 A1 11/2015

OTHER PUBLICATIONS

Great Britain search report dated Jun. 6, 2018, issued in GB Patent Application No. 1720727.5.
(Continued)

*Primary Examiner* — Courtney D Heinle
*Assistant Examiner* — Michael K. Reitz
(74) *Attorney, Agent, or Firm* — Shumaker & Sieffert, P.A.

(57) ABSTRACT

A bleed valve system comprises a duct, featuring a central longitudinal axis and allowing a main flow of fluid to pass from a first environment at a first static pressure to a second environment at a second static pressure along a bleed direction, a valve comprising a valve member arranged within the duct between the first and second environments and movable to partially obstruct the duct and deviate the main flow of fluid to direct at least a part of it towards a portion of an internal wall of the duct; and an ejector, arranged within the duct, downstream of the valve member and offset from the central longitudinal axis in correspon-
(Continued)

dence of said portion of the internal wall, adapted to supply an additional flow of fluid within the duct to accelerate the main flow of fluid and reduce the second static pressure.

18 Claims, 2 Drawing Sheets

(51) Int. Cl.
  *F02C 9/18* (2006.01)
  *F02C 7/05* (2006.01)
  *F04D 27/02* (2006.01)
  *F01D 25/32* (2006.01)
(52) U.S. Cl.
  CPC .............. *F02C 9/18* (2013.01); *F04D 27/023* (2013.01); *F04D 27/0215* (2013.01); *F04D 27/0238* (2013.01); *F04D 27/0292* (2013.01); *F05D 2220/32* (2013.01); *F05D 2220/3218* (2013.01); *F05D 2260/601* (2013.01); *F05D 2260/607* (2013.01); *F05D 2260/80* (2013.01); *F05D 2270/3015* (2013.01)
(58) Field of Classification Search
  CPC .. F04D 27/023; F04D 27/0215; F04D 27/009; F04D 27/0207
  See application file for complete search history.

(56) References Cited

U.S. PATENT DOCUMENTS

| | | | |
|---|---|---|---|
| 4,928,480 | A | 5/1990 | Oliver et al. |
| 4,972,672 | A | 11/1990 | Sanderson et al. |
| 6,282,881 | B1 | 9/2001 | Beutin et al. |
| 6,550,253 | B2* | 4/2003 | Mortzheim ........... F01D 17/105 60/782 |
| 2014/0250895 | A1 | 9/2014 | McMahon et al. |
| 2015/0260100 | A1 | 9/2015 | Trohel |
| 2016/0130972 | A1* | 5/2016 | Kozuch .................... F01D 5/02 415/145 |
| 2017/0114657 | A1 | 4/2017 | Hussain et al. |

OTHER PUBLICATIONS

Response to Extended European Search Report from counterpart EP application No. 18206215.8 dated May 7, 2019, filed Nov. 1, 2019, 41 pgs.

Extended European Search Report from counterpart EP application No. 18206215.8 dated May 7, 2019, 7 pgs.

* cited by examiner

BLEED EJECTOR

CROSS-REFERENCE TO RELATED APPLICATIONS

This specification is based upon and claims the benefit of priority from UK Patent Application Number 1720727.5 filed on 13 Dec. 2017, the entire contents of which are incorporated herein by reference.

BACKGROUND

Technical Field

The present disclosure relates to a gas turbine engine, and in particular to a bleed valve system and a method of operating such a bleed valve system in a gas turbine engine.

Description of the Related Art

A gas turbine engine generally comprises, in axial flow series, an air intake, a fan, one or more compressors, a combustor, one or more turbines, and an exhaust nozzle. Air entering the air intake is accelerated by the fan to produce two air flows: a first air flow into compressor and a second air flow which passes through a bypass duct to provide propulsive thrust. A ratio of mass air flow entering the compressor to mass air flow passing through the bypass duct defines an engine bypass ratio. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

Gas turbine engines can be damaged by Foreign Object Debris (FOD) sucked into the air intake. FOD is any substance, debris or article, such as ash or ice, alien to the gas turbine engine that can damage any of its components. FOD entering into low pressure stages of the compressor is particularly dangerous, as it can reach high pressure stages of the compressor, the combustor and then the turbine.

To prevent FOD from entering into the combustor, FOD is generally expelled through a bleed system connected at a first end to a bleed port achieved on a casing of the compressor at a defined compressor stage and at a second end to the bypass duct. A pressure ratio is defined between the compressor and the bypass duct as the static pressure of the compressor at the bleed port divided by the static pressure of the bypass duct. As the compressor is generally at a static pressure higher than the static pressure of the bypass duct, the pressure ratio is higher than one and air is bled from the compressor and FOD is expelled towards the bypass duct.

The static pressure in the compressor, for a given geometry of compressor stators and vanes, is generally defined by the rotational speed of the compressor: the higher the rotational speed, the higher the static pressure.

In certain conditions, the static pressure in the compressor may decrease to such an extent that the pressure ratio is not sufficient to bleed FOD off of the compressor. Consequently, there is a risk of flow migration from the bypass duct back to the compressor and/or of accumulating FOD within the compressor.

Accordingly, it is desirable to provide an improved FOD expel system.

SUMMARY

According to a first aspect, there is provided a bleed valve system comprising a duct, featuring a central longitudinal axis and allowing a main flow of fluid to pass from a first environment at a first static pressure to a second environment at a second static pressure along a bleed direction; a valve member, arranged within the duct between the first environment and the second environment and movable to partially obstruct the duct and divert the main flow of fluid to direct at least a part of the main flow of fluid towards a portion of an internal wall of the duct; and an ejector, arranged within the duct, downstream of the valve member and offset from the central longitudinal axis in correspondence of said portion of the internal wall, adapted to supply an additional flow of fluid within the duct to accelerate the at least a part of the main flow of fluid and reduce the second static pressure.

According to Bernoulli's principle, as the speed of a flow increases, the static pressure of the flow decreases. Therefore, by supplying the additional flow of fluid, the part of the main flow of fluid diverted by the valve member accelerates downstream of the valve member and its static pressure decreases. As the second static pressure decreases, the pressure ratio, i.e. the first static pressure divided by the second static pressure, increases preventing the main flow of fluid from flowing back to the first environment and allowing to expel any FOD from the first environment.

The valve member may divert at least a part of the main flow of fluid to create a vena contract in that part of the main flow downstream of the valve member. In one embodiment, the valve member may divert a majority of the main flow to create a vena contracta in that majority of the main flow downstream of the valve member.

The ejector may be arranged such that the additional flow of fluid is effective on the part of the main flow of fluid in the vena contracta. The ejector may be arranged in correspondence of the vena contracta.

By deviating the main flow of fluid to direct at least a part of the main flow of fluid towards a portion of an internal wall of the duct and arranging the ejector offset from the central longitudinal axis in correspondence of the portion of the internal wall, the additional flow of fluid may maximise its effect on that part of the main flow of fluid downstream of the valve member.

The ejector may include a nozzle arranged transversal to the central longitudinal axis.

The nozzle may be arranged convergent to the central longitudinal axis of the duct along the bleed direction.

The nozzle may comprise an exit. The exit of the nozzle may be arranged offset from the central longitudinal axis of the duct.

The exit of the nozzle may be arranged downstream of the vena contracta.

The exit of the nozzle may feature a circular, oval, or straight or curved (e.g. arched) slot shaped cross section.

The valve may comprise a valve body defining a tract of the duct.

The valve member, when in an open position, may divide the main flow of fluid in a first flow and a second flow of fluid, the first flow of fluid having a mass flow higher that the mass flow of the second flow of fluid.

The ejector may be arranged to accelerate the first flow of fluid.

The nozzle of the ejector may be awash in the first flow of fluid.

The valve member may include a disc, a rotation angle being defined between a longitudinal plane of the disc and the central longitudinal axis of the duct. The disc may be rotatable about an axis of rotation perpendicular to the central longitudinal axis for rotation angles between 0°, wherein the disc is arranged perpendicular to the central longitudinal axis and closes the duct, and 90°, wherein the disc is arranged parallel to the central longitudinal axis and the valve is fully open. When the disc is not perpendicular to the central longitudinal axis of the duct, i.e. for rotation angles different from 0°, the disc is in intermediate open positions and allows a flow of fluid from the first environment to the second environment.

The disc, when in an open position, may feature a leading edge and a trailing edge, the leading edge being upstream of the trailing edge along the bleed direction. The internal wall of the duct may feature a first portion facing the leading edge of the disc and a second portion facing the trailing edge of the disc. The nozzle may be arranged closer to the second portion than to the first portion of the internal wall of the duct. The nozzle may be arranged downstream of the trailing edge.

In other words, the leading edge of the disc may be arranged in correspondence of the first portion of the internal wall of the duct and the trailing edge of the disc may be arranged in correspondence of the a second portion of the internal wall of the duct.

The disc, when in an open position, may divide the main flow of fluid into the first flow and the second flow of fluid. The first flow may flow between the trailing edge of the disc and the second portion of the internal wall of the duct through a first flow surface perpendicular to the central longitudinal axis. The second flow may flow between the leading edge of the disc and the first portion of the internal wall of the duct through a second flow surface perpendicular to the central longitudinal axis. It is to be noted that the first flow surface may be as large as the second flow surface.

The disc, when in an open position, may divert and divide the main flow into two flows (the first flow and the second flow), with different mass flow, but flowing through equally large flow surfaces. Consequently, the first flow, which has mass flow higher than the mass flow of the second flow, is accelerated with respect to the second flow. In this respect, the nozzle of the ejector may be arranged immediately downstream of the trailing edge of the disc to supply the additional flow of fluid and accelerate the first flow.

The ejector may be arranged sufficiently downstream of the trailing edge such not to prevent rotation of the disc. The nozzle of the ejector may be arranged to lie on a plane perpendicular to the axis of rotation of the disc and containing the central longitudinal axis of the duct.

The exit of the nozzle may feature a straight slot shaped cross section arranged parallel to the axis of rotation of the disc.

The valve may be a butterfly valve and the valve member, or the disc, may be a butterfly.

The duct may have a circular cross section and the valve member may be a circular disc.

Alternatively, the valve may be a ball valve and the valve member may be a holed ball.

A butterfly valve and a ball valve may divert the main flow of fluid to direct at least a part of the main flow of fluids towards a portion the internal wall of the duct, where the ejector may be arranged, downstream of the butterfly and ball valves, to supply an additional flow of fluid and accelerate the at least a part of the main flow of fluid and reduce the second static pressure.

According to a second aspect, there is provided a gas turbine engine comprising a compressor including a casing and a bleed port achieved therein; a bypass duct comprising a bypass port; and a bleed valve system according to the first aspect, wherein the duct of the bleed valve system is connected to the bleed port and the bypass port.

According to a third aspect, there is provided a method of expelling foreign object debris in a gas turbine engine comprising a compressor provided with a bleed port and a bypass duct provided with a bypass port, the method comprising: providing a bleed valve system according to the first aspect; connecting a first end of the duct of the bleed valve system to the bleed port and a second end of the duct of the bleed valve system to the bypass port, deviating the main flow of fluid to direct at least a part of the main flow of fluid towards a portion of an internal wall of the duct, detecting a pressure ratio between a first static pressure upstream of the valve and a second static pressure downstream of the valve, and, upon reaching a threshold value of said pressure ratio, supplying the additional flow of fluid through the ejector to accelerate the at least a part of the main flow of fluid and reduce the second static pressure.

Detecting a pressure ratio between a first static pressure downstream of the valve and a second static pressure upstream of the valve may comprise detecting the pressure ratio between a first static pressure at the bleed port and a second static pressure at the bypass port.

Detecting the pressure ratio between a first static pressure at the bleed port and a second static pressure at the bypass port may comprise deriving the pressure ratio from available parameters of the engine, such as for example compressor rotational speed, altitude, any variable geometry control (e.g. vanes) or any combination thereof. Parameter values may be processed in the Engine Electronic Controller (EEC).

Alternatively, or in addition, pressure sensors may be arranged at, or in proximity of, the bleed port and the bypass port to directly measure the first and second static pressures.

The valve member may include a disc, a rotation angle being defined between a longitudinal plane of the disc and the central longitudinal axis of the duct, the disc being rotatable about an axis of rotation perpendicular to the central longitudinal axis for rotation angles between 0°, wherein the disc is arranged perpendicular to the central longitudinal axis and closes the duct, and 90°, wherein the disc is arranged parallel to the central longitudinal axis, the method further comprising arranging the disc at a rotation angle between 1° and 75°, preferably 1° and 50°, more preferably 1° and 25°.

The method of the third aspect may further comprise dividing the main flow of fluid in a first flow and a second flow of fluid, the first flow of fluid having a mass flow higher than the mass flow of the second flow of fluid, and, upon reaching a threshold value of said pressure ratio, accelerating the first flow by means of the additional flow of fluid supplied by the ejector.

When arranging the disc at a rotation angle between 1° and 75°, preferably 1° and 50°, more preferably 1° and 25°, the disc may divert and divide the main flow into the first flow and the second flow.

The method may further comprise providing the bleed valve system with an ejector with a rotatable nozzle and rotating the nozzle and the disc such as to maintain a constant mutual orientation.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
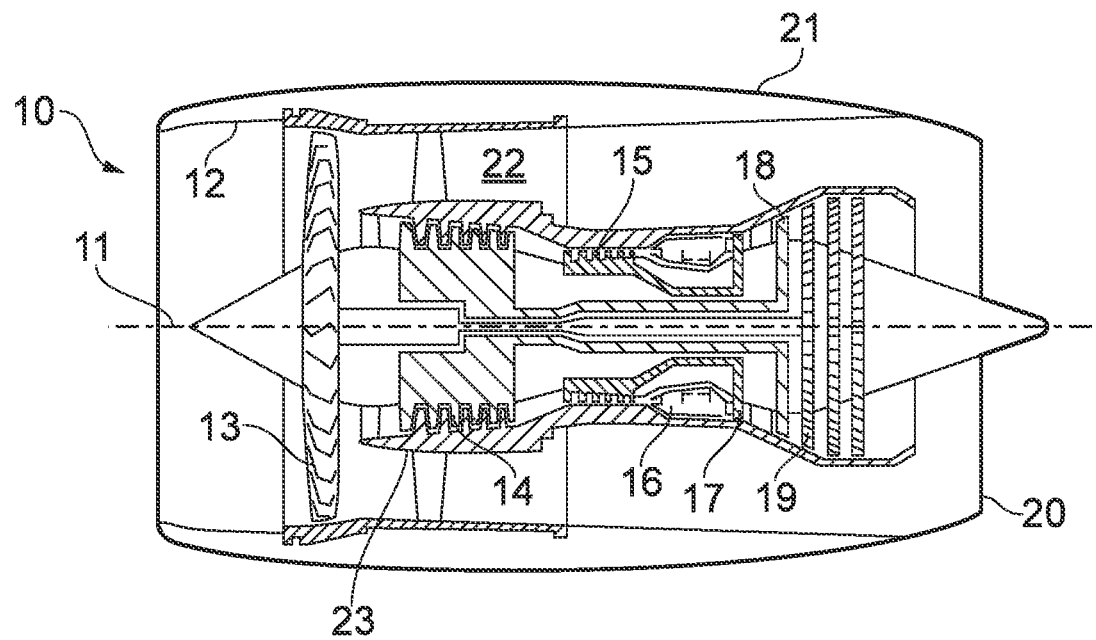
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
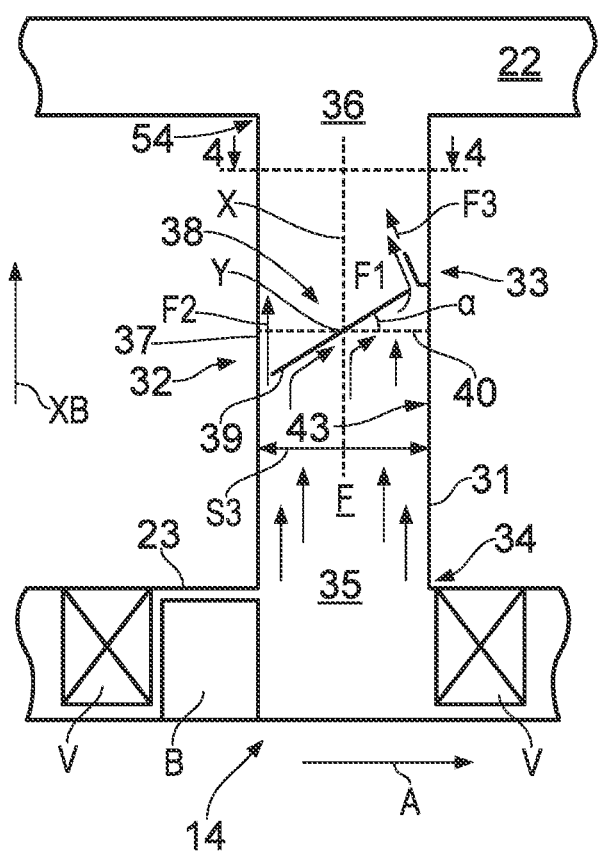
FIG. 2 is an enlarged, schematic side view of a bleed valve system arranged between a compressor and a bypass duct according to an embodiment.
Figure 3:
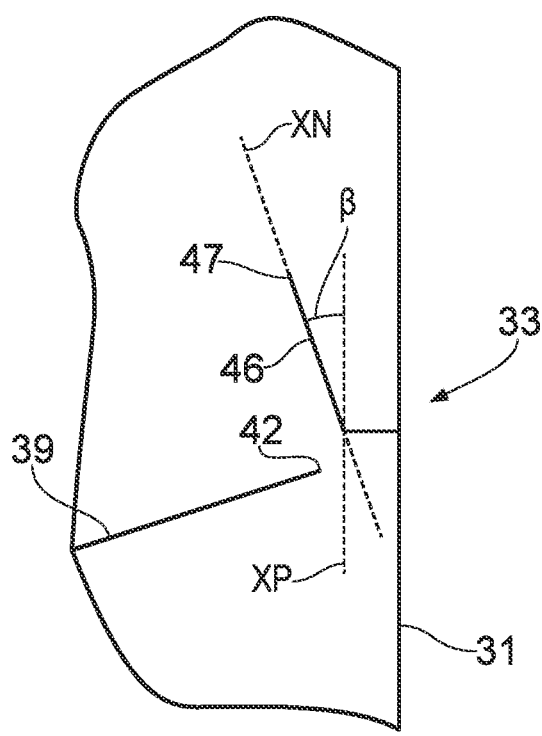
FIG. 3 is an enlarged, schematic side view of a detail of FIG. 2.
Figure 4:
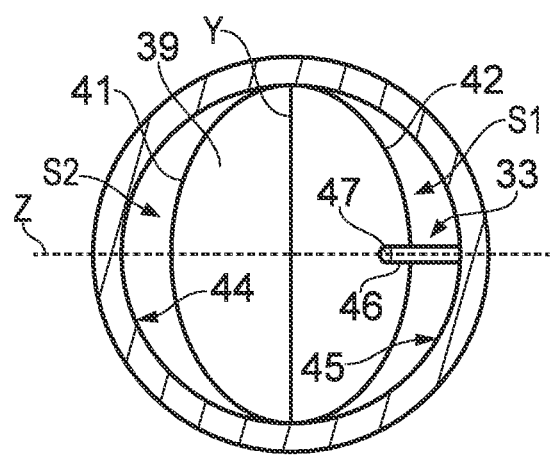
FIG. 4 is a cross section view of a duct of the bleed valve system of FIG. 2, taken along line 4-4 of FIG. 2.

With reference to FIGS. 2 to 4, where proportions have been exaggerated for sake of clarity, a portion of the intermediate pressure compressor 14, a portion of the bypass duct 22 and a bleed valve system 30 arranged therebetween are illustrated. In other words, the bleed valve system 30 connects the bypass duct 22 with the intermediate pressure compressor 14. In alternative non-illustrated embodiments, the bleed valve system 30 may connect the bypass duct 22 with the high pressure compressor 15, or with an intermediate zone between the intermediate pressure compressor 14 and the high pressure compressor 15.

The compressor 14 comprises a plurality of circumferential rows of stator vanes V and a plurality of circumferential rows of rotor blades B, each row of stator vanes V being axially adjacent a row of rotor blades B. As illustrated in FIG. 2, air entering the compressor 14 flows along an advancement direction A.

A casing 23 houses the compressor 14. A bleed aperture, or port, 35 is achieved on the casing 23 to bleed air from the compressor 14. The bleed port 35 is arranged immediately downstream, with respect to the advancement direction A, of a rotor blade B. Alternatively, in other non-illustrated embodiment, the bleed port 35 may be arranged immediately downstream of a stator vane V. The bypass duct 22 comprises a bypass aperture, or port, 36. The bleed valve system 30 is connected to the bleed port 35 and the bypass aperture 36.

For a given circumferential row of stator vanes V and adjacent rotor blades B, which defines a compressor stage, a plurality of bleed ports 35, a plurality of bypass ports 36 and a corresponding plurality of bleed valve systems 30 may be provided.

The bleed valve system 30 comprises a duct 31, a valve 32 and an ejector 33.

The duct 31 features a central longitudinal axis X, a first end 34 connected to the bleed port 35 and a second end 54 connected to the bypass port 36. As the compressor 14 is at a first static pressure higher than the static pressure of the bypass duct 22, when open, the valve 32 allows bleeding a main flow F of air from the compressor 14 to the bypass duct 22.

The valve 32 includes a valve body 37 and a valve member 38. In the illustrated embodiment, the valve body 37 defines a part of the duct 31.

In the embodiment illustrated, the valve 32 is a butterfly valve and the valve member 38 is a butterfly, or disc, 39. The valve 32 may comprise other components, like actuators and gaskets, not illustrated for sake of simplicity.

The disc 39 is rotatable about an axis of rotation Y, perpendicular to the central longitudinal axis X of the duct 31. A longitudinal plane of the disc 39 forms a rotation angle α with a cross section 40 of the duct 31 containing the axis of rotation Y. When the rotation angle α is 0°, the disc 39 is perpendicular to the central longitudinal axis X in a closed position and closes the duct 31. When the rotation angle α is different from 0°, the disc 39 is in an open position and the main flow F of air can flow from the compressor 14 towards the bypass duct 22.

The disc 39 comprises a leading edge 41 and a trailing edge 42. When the rotation angle α is different from 0°, the disc 39 is arranged such as to present, with respect to a bleed direction XB parallel to the central longitudinal axis X from the compressor 14 towards the bypass duct 22, the leading edge 41 upstream of the leading edge 42.

In the embodiment illustrated, both the disc 39 and the duct 31 have circular cross section. In other not illustrated embodiments, the disc and the duct may have non-circular cross sections.

The duct 31 comprises an internal wall 43 comprising a first portion 44 facing the leading edge 41 of the disc 39 and a second portion 45 facing the trailing edge 42 of the disc 39. In other words, the leading edge 41 and the trailing edge 42 of the disc 39 are arranged in correspondence of the first portion 44 and second portion 45 of the internal wall 43 of the duct 31, respectively.

The disc 39, when in an open position, diverts and divides the main flow F into a first flow F1 of air and a second flow F2 of air. The first flow F1 is diverted towards a first flow surface 51 defined, in cross section, between the trailing edge 42 of the disc 39 and the second portion 45 of the internal wall 43 of the duct 31. The second flow F2, which is not substantially diverted, flows through a second flow surface S2 defined, in cross section, between the leading edge 41 of the disc 39 and the first portion 44 of the internal wall 43 of the duct 31.

The first flow F1 has a mass flow higher than the mass flow of the second flow F2. In other words, the disc 39 divides the main flow F and encourages a majority (the first flow F1) of the main flow F to travel through the first flow surface 51. As clearly visible in FIGS. 2 and 4, the first flow surface 51 is as large as the second flow surface S2 and smaller than a cross section S3 of the duct 31 upstream of the disc 39. In other words, when the rotation angle α is different from 0° and smaller than 90°, preferably different from 0° and smaller than 50°, more preferably different from 0° and smaller than 25°, the disc 39 manipulates the main flow F and forces the first flow F1 to pass through the first flow surface 51. As a consequence, the first flow F1 presents a vena contracta downstream of the trailing edge 42.

The ejector 33 is arranged within the duct 31 and downstream of the disc 39 to supply an additional flow F3 of fluid (e.g. air) to be effective on the first flow F1 in the vena contracta. The additional flow F3 of fluid has substantially the same direction of the first flow F1 in the vena contracta. In terms of mass flow, the ratio between the additional flow F3 and the first flow F1 may be less than 1:10, for example less than 1:50, or less than 1:100. The additional flow F3 accelerates the first flow F1, causing a decrease in the static pressure of the first flow F1, thus in the main flow F, downstream of the valve 32. In other words, the additional flow F3 increases the pressure ratio between the compressor 14 and the bypass duct 22, allowing FOD to be expelled from the compressor 14 and preventing flow to travel from the bypass duct 22 back towards the compressor 14.

The ejector 33 comprises a nozzle 46 with an exit 47. The nozzle extends along a longitudinal axis XN. In the illustrated embodiment, the longitudinal axis XN of the nozzle 46 is transversal to the central longitudinal axis X. The nozzle 46 directs the additional flow F3 towards the central longitudinal axis X. In other words, the nozzle is arranged convergent to the central longitudinal axis X. The longitudinal axis XN is substantially parallel to the flow F1 in the vena contracta. Being β the acute angle between the longitudinal axis XN and the central longitudinal axis X, β may be comprised between 1° and 45°, or 1° and 30°, or 5° and 25°. To illustrate the angle β, in FIG. 4 a direction XP, parallel to the central longitudinal axis X, is depicted.

In one embodiment, the nozzle 46 is arranged in a fixed position. Alternatively, the nozzle 46 may be rotatable about a nozzle rotation direction parallel to the axis of rotation Y of the disc 39, such as to vary the angle β. The nozzle 46 may be rotated to maintain a constant angle to the longitudinal plane of the disc 39 for any rotation angle α. In one embodiment, the nozzle 46 is arranged perpendicular to the disc 39.

Although the duct 31 has been illustrated as straight, in other non-illustrated embodiments the duct 31 may feature a curved central longitudinal axis X. The valve may be arranged either in a curved tract or in a straight tract of the duct 31. In such embodiments, β is defined as the angle between the longitudinal axis XN and central longitudinal axis X in correspondence of a transversal cross section of the duct 31 including the nozzle exit 47.

Moreover, the nozzle 46 is arranged to lie on a plane Z perpendicular to the axis of rotation Y of the disc 39 and containing the central longitudinal axis X of the duct 31.

Figure 5:
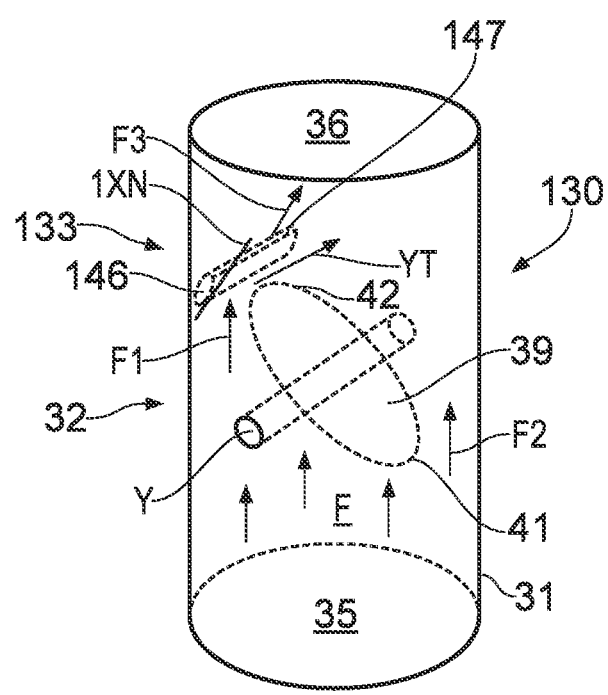
FIG. 5 is a schematic isometric view of the bleed valve system according to another embodiment.

With reference to FIG. 5, there is illustrated a bleed valve system 130 according to another embodiment. Same features between FIGS. 2-4 and 5 are given same reference numerals, and will not be described in detail again in relation to FIG. 5. Similar reference numerals are used for similar features as those previously described, but with a prefix "1". Mainly the differences between the present embodiment and the previous embodiment will be described.

The bleed valve system 130 comprises a duct 31, a valve 32 and an ejector 133, and is arranged between the bleed port 35 of a compressor (not illustrated) and the bypass port 36 of a bypass duct 22 (not illustrated).

The ejector 133 is arranged within the duct 31 and downstream of the disc 39 to supply the additional flow F3 of fluid to be effective on the first flow F1 in the vena contracta.

The ejector 133 comprises a nozzle 146 with an exit 147. The nozzle 146 has a flat shape and extends longitudinally along a longitudinal axis 1XN and transversally along a transversal axis YT.

The longitudinal axis 1XN is transversal to the central longitudinal axis X. As in the embodiment of figures FIGS. 2-4, the nozzle 146 is arranged convergent to the central longitudinal axis X of the duct 31. The longitudinal axis 1XN is substantially parallel to the flow F1 in the vena contracta. Being β the acute angle between the longitudinal axis 1XN and the central longitudinal axis X, β may be comprised between 1° and 45°, or 1° and 30°, or 5° and 25°.

The transversal axis YT is parallel to the axis of rotation Y of the disc 39.

The exit 147 is slot shaped in cross section. In the illustrated embodiment, the slot is straight, i.e. substantially rectangular in shape, and extends along the transversal axis YT. In other not illustrated embodiment, the slot may be curved, for example arched such as to be parallel to the trailing edge of the disc 39.

In one embodiment, the nozzle 146 is arranged in a fixed position. Alternatively, the nozzle 146 may be rotatable about a nozzle rotation direction parallel to the transversal axis YT and therefore parallel to the axis of rotation Y of the disc 39. The nozzle 146 may be rotated about the nozzle rotation direction to maintain a constant orientation relative to the longitudinal plane of the disc 39 for any rotation angle α. In one embodiment, the nozzle 146 is arranged perpendicular to the longitudinal plane of the disc 39.

A method of expelling foreign object debris in a gas turbine engine 10 comprising a compressor (14, 15) provided with a bleed port 35 and a bypass duct 22 provided with a bypass port 36 will now be described with reference to FIGS. 1 to 5.

The method comprises providing a bleed valve system 30, 130 as above described and connecting a first end 34 of the duct 31 of the bleed valve system 30, 130 to the bleed port 35 and a second end 54 of the duct 31 of the bleed valve system 30, 130 to the bypass port 36 and deviating the main flow F of fluid to direct at least a part (F1) of the main flow F of fluid towards a portion of an internal wall 43 of the duct 31.

The method further comprises detecting a pressure ratio between a first static pressure upstream of the valve 32 and a second static pressure downstream of the valve 32, and, upon reaching a threshold value of the pressure ratio, supplying the additional flow F3 of fluid through the ejector 33, 133 to accelerate the at least a part (F1) of the main flow F of fluid and reduce the second static pressure.

The pressure ratio may be detected between the bleed port 35 and the bypass port 36. The static pressure at the bleed port 35 may be calculated as a function of a rotational speed of the compressor.

Detecting the pressure ratio between a first static pressure at the bleed port 35 and a second static pressure at the bypass port 36 may comprise deriving the pressure ratio from available parameters of the engine, such as for example compressor rotational speed, altitude, any variable geometry control (e.g. vanes) or any combination thereof. Parameter values may be processed in the Engine Electronic Controller (EEC).

Alternatively, or in addition, pressure sensors may be arranged at, or in proximity of, the bleed port 35 and the bypass port 36 to directly measure the first and second static pressures.

When the valve member 38 includes a disc 39, for example a butterfly of a butterfly valve, the method further comprises arranging the disc 39 at a rotation angle α (the angle between the longitudinal plane of the disc 39 and the central longitudinal axis of the duct 31) between 1° and 75°, preferably 1° and 50°, more preferably 1° and 25°.

The method may further comprise providing the ejector 33, 133 with a rotatable nozzle 46, 146 and rotating the nozzle 46, 146 and disc 39 such as to maintain a constant mutual orientation. In particular, the method may further comprise rotating the nozzle 46, 146 and disc 39 such as to maintain a constant orientation between the longitudinal axis XN, 1XN of the nozzle 46, 146 and the longitudinal plane of the disc 39.

The method may further comprise dividing the main flow F of fluid in a first flow F1 and a second flow F2 of fluid, the first flow F1 of fluid having a mass flow higher than the mass flow of the second flow F2 of fluid, and, upon reaching the threshold value of pressure ratio, accelerating the first flow F1 by means of the additional flow F3 supplied by the ejector 33, 133.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A bleed valve system comprising:
   a duct, featuring a central longitudinal axis and allowing a main flow of fluid to pass from a first environment at a first static pressure to a second environment at a second static pressure along a bleed direction;
   a valve comprising a valve member arranged within the duct between the first environment and the second environment and movable to partially obstruct the duct, wherein the valve member, when in an open position, divides the main flow of fluid in a first flow of fluid and a second flow of fluid, the first flow of fluid having a mass flow higher than the mass flow of the second flow of fluid; and
   an ejector, arranged within the duct downstream of the valve member and offset from the central longitudinal axis at a longitudinal and circumferential portion of the internal wall corresponding to the location of a vena contracta created by the valve member for at least one rotation angle of the valve member greater 0 degrees and less than 70 degrees, wherein the ejector is configured to supply an additional flow of fluid within the duct to accelerate the first flow of fluid and reduce the second static pressure.

2. The bleed valve system according to claim 1, wherein the ejector includes a nozzle arranged transversal to the central longitudinal axis.

3. The bleed valve system according to claim 2, wherein the nozzle is arranged convergent to the central longitudinal axis of the duct along the bleed direction.

4. The bleed valve system according to claim 1, wherein the ejector is arranged to accelerate the first flow of fluid.

5. The bleed valve system according to claim 4, wherein the nozzle of the ejector is awash in the first flow of fluid.

6. The bleed valve system according to claim 1, wherein the valve member includes a disc, a rotation angle being defined between a longitudinal plane of the disc and the central longitudinal axis of the duct, the disc being rotatable about an axis of rotation perpendicular to the central longitudinal axis for rotation angles between 0°, wherein the disc is arranged perpendicular to the central longitudinal axis and closes the duct, and 90°, wherein the disc is arranged parallel to the central longitudinal axis.

7. The bleed valve system according to claim 6, wherein the disc, when in an open position, features a leading edge and a trailing edge, the leading edge being upstream of the trailing edge along the bleed direction, the internal wall of the duct featuring a first portion facing the leading edge of the disc and a second portion facing the trailing edge of the disc, the nozzle being arranged closer to the second portion than to the first portion of the internal wall of the duct.

8. The bleed valve system according to claim 1, wherein the duct has a circular cross section and the valve member is a circular disc.

9. The bleed valve system according to claim 1, wherein the valve is a butterfly valve or a ball valve.

10. A gas turbine engine comprising:
    a compressor including a casing and a bleed port achieved therein;
    a bypass duct comprising a bypass port; and
    a bleed valve system according to claim 1, wherein the duct of the bleed valve system is connected to the bleed port and the bypass port.

11. A method of expelling foreign object debris in a gas turbine engine comprising a compressor provided with a bleed port and a bypass duct provided with a bypass port, the method comprising:
    providing a bleed valve system comprising:
       a duct, featuring a central longitudinal axis and allowing a main flow of fluid to pass from a first environment at a first static pressure to a second environment at a second static pressure along a bleed direction;
       a valve comprising a valve member arranged within the duct between the first environment and the second environment and movable to partially obstruct the duct, wherein the valve member, when in an open position, divides the main flow of fluid in a first flow of fluid and a second flow of fluid, the first flow of fluid having a mass flow higher than the mass flow of the second flow of fluid; and
       an ejector, arranged within the duct downstream of the valve member and offset from the central longitudinal axis at a longitudinal and circumferential portion of the internal wall corresponding to the location of a vena contracta created by the valve member for at least one rotation angle of the valve member greater 0 degrees and less than 70 degrees, wherein the ejector is configured to supply an additional flow of fluid within the duct to accelerate the first flow of fluid and reduce the second static pressure;
connecting a first end of the duct of the bleed valve system to the bleed port and a second end of the duct of the bleed valve system to the bypass port;
deviating the main flow of fluid to direct the first flow of fluid towards the longitudinal and circumferential portion of the internal wall of the duct;
dividing the main flow of fluid in the first flow and a second flow of fluid, the first flow of fluid having a mass flow higher that the mass flow of the second flow of fluid;
detecting a pressure ratio between a first static pressure upstream of the valve and a second static pressure downstream of the valve; and
upon reaching a threshold value of the pressure ratio, supplying the additional flow of fluid through the ejector to accelerate the first flow of fluid and reduce the second static pressure.

12. The method according to claim 11, wherein detecting a pressure ratio between a first static pressure upstream of the valve and a second static pressure downstream of the valve comprises detecting the pressure ratio between a first static pressure at the bleed port and a second static pressure at the bypass port.

13. The method according to claim 11, wherein the valve member includes a disc, a rotation angle being defined between a longitudinal plane of the disc and the central longitudinal axis of the duct, the disc being rotatable about an axis of rotation perpendicular to the central longitudinal axis for rotation angles between 0°, wherein the disc is arranged perpendicular to the central longitudinal axis and closes the duct, and 90°, wherein the disc is arranged parallel to the central longitudinal axis, the method further comprising arranging the disc at a rotation angle between 1° and 75°.

14. The method according to claim 13, further comprising arranging the disc at a rotation angle between 1° and 50°.

15. The method according to claim 14, further comprising arranging the disc at a rotation angle between 1° and 25°.

16. The bleed valve system according to claim 1, wherein the valve member causes the first flow to present a vena contracta downstream of a trailing edge of the valve member, and wherein the ejector is arranged within the duct to supply the additional flow of fluid to the first flow of fluid in the vena contracta.

17. The bleed valve system according to claim 1, wherein the ejector comprises a nozzle, and wherein the nozzle is configured to rotate to maintain a constant angle of a longitudinal axis of nozzle relative to a plane of the valve member.

18. The bleed valve system according to claim 17, wherein the constant angle is 90 degrees.

* * * * *